(12) United States Patent
Heitner et al.

(10) Patent No.: US 8,392,292 B2
(45) Date of Patent: Mar. 5, 2013

(54) METHOD AND PROCESS FOR MANAGING INBOUND AND OUTBOUND MERCHANDISE SHIPMENTS

(75) Inventors: Ami Heitner, Kfar Saba (IL); Ziv Holzman, Tel-Aviv (IL); Orit Harel, Kadima (IL)

(73) Assignee: SAP Aktiengesellschaft, Walldorf (DE)

( * ) Notice: Subject to any disclaimer, the term of this patent is extended or adjusted under 35 U.S.C. 154(b) by 2431 days.

(21) Appl. No.: 10/403,497

(22) Filed: Mar. 31, 2003

(65) Prior Publication Data

US 2004/0193502 A1 Sep. 30, 2004

(51) Int. Cl.
*G06Q 10/00* (2012.01)
(52) U.S. Cl. ......................................................... 705/28
(58) Field of Classification Search ...................... 705/28
See application file for complete search history.

(56) References Cited

U.S. PATENT DOCUMENTS

| | | | |
|---|---|---|---|
| 6,622,127 B1* | 9/2003 | Klots et al. ...................... | 705/28 |
| 7,177,825 B1 | 2/2007 | Borders et al. | |
| 2002/0019759 A1 | 2/2002 | Arunapuram et al. | |
| 2002/0194057 A1* | 12/2002 | Lidow .............................. | 705/10 |
| 2003/0172007 A1* | 9/2003 | Helmolt et al. .................. | 705/28 |
| 2003/0212614 A1* | 11/2003 | Chu et al. ......................... | 705/28 |
| 2004/0153379 A1* | 8/2004 | Joyce et al. ...................... | 705/28 |
| 2004/0193502 A1 | 9/2004 | Heitner et al. | |

OTHER PUBLICATIONS

Bartholdi III, John J. et al., 'Throughput Models for Unit-Load Crossdocking,' Jun. 7, 2001, http://web.nps.navy.mil/~krgue/Publications/tput.pdf.
EXE Technologies, 'Exceed Crossdock,' downloaded Mar. 16, 2003, http://www.exe.com/.
Beykirch, Martin, Non-Final Office Action dated Sep. 3, 2008, U.S. Appl. No. 11/297,976, filed Dec. 8, 2005, 13 pgs.
Beykirch, Martin, Non-Final Office Action dated Mar. 11, 2008, U.S. Appl. No. 11/297,976, filed Dec. 8, 2005, 10 pgs.

* cited by examiner

*Primary Examiner* — Faris Almatrahi
(74) *Attorney, Agent, or Firm* — Blakely, Sokoloff, Taylor & Zafman LLP

(57) ABSTRACT

A computer program, method, and systems for monitoring inbound documents. Each of these inbound documents, which concerns the delivery of inbound merchandise to a processing center, itemizes one or more available products included in the inbound merchandise. Outbound documents, each of which concerns the shipping of outbound merchandise from the processing center, are also monitored. These outbound documents each itemize one or more needed products to be included in the outbound merchandise. The available products itemized in one or more inbound documents are compared to the needed products itemized in one or more outbound documents to determine if a match occurs. If such a match occurs, the matched available and needed products are linked, such that an outstanding order for a needed product is fulfilled with an available product.

60 Claims, 4 Drawing Sheets

METHOD AND PROCESS FOR MANAGING INBOUND AND OUTBOUND MERCHANDISE SHIPMENTS

BACKGROUND

The present invention relates to inventory processing, and more particularly to data processing of inbound and outbound merchandise shipments.

In today's warehouse environments, customers aim to handle materials more efficiently and minimize unnecessary material double handling to reduce cycle times, inventory and handling costs. Maximizing cross-dock utilization is one way of achieving this goal. Cross-docking is defined as a method of processing materials through the warehouse so that materials are brought from the goods receipt area directly to the point of goods issue without first being stored in a bin in the warehouse.

SUMMARY OF THE INVENTION

In one general aspect, a warehouse execution planning system includes an inbound document monitoring process for monitoring inbound documents. Each of these inbound documents, which concerns the delivery of inbound merchandise to a processing center, itemizes one or more available products included in the inbound merchandise.

An outbound document monitoring process monitors outbound documents. Each of these outbound documents, which concerns the shipping of outbound merchandise from the processing center, itemizes one or more needed products to be included in the outbound merchandise.

A matching process compares the available products itemized in one or more inbound documents to the needed products itemized in one or more outbound documents to determine if a match occurs.

A linking process, which is responsive to a match occurring between an available product and a needed product, links the matched available and needed products, such that an outstanding order for a needed product is fulfilled with an available product.

Implementations may include one or more of the following features. An execution process defines a minimum pick quantity (e.g., a case or a pallet), such that the minimum pick quantity specifies the minimum quantity of an available product that may be used to fulfill an outstanding order for a needed product.

The inbound merchandise is delivered to the processing center in one or more inbound containers, and the outbound merchandise is delivered from the processing center in one or more outbound containers, such as a trailer or a railroad car. A bay scheduling process assigns each of the inbound and outbound containers to a bay (e.g., a garage door), such that the inbound merchandise is unloaded from the inbound container in the bay to which the inbound container is assigned, and the outbound merchandise is loaded into the outbound container in the bay to which the outbound container is assigned.

A cross-docking area designation process assigns one or more cross-docking areas to one or more of the available products included in the inbound merchandise. These available products, which are unloaded from an inbound container, are placed in the cross-docking area and divvied up to fulfill multiple outstanding orders for needed products. The cross-docking area designation process includes an area limiting process for defining a maximum number of cross docking areas. This maximum cross-docking number specifies the maximum number of cross-docking areas available to one or more of the available products included in the inbound merchandise.

A storage process designates a storage area (e.g., a storage bin or a cold storage area) for any residual available products that are unmatched after all outstanding orders have been fulfilled. The storage process includes a batch process for defining a time limit (i.e., time parameter) before which any matching of residual available products must occur.

A VAS definition process defines the value added services to be applied to one or more of the available products. The VAS definition process includes a VAS area designation process for assigning one or more VAS areas to the one or more available products to which the value added services are applied.

The outbound merchandise is delivered from the processing center in one or more outbound containers (e.g., a trailer or a railroad car).

A consolidation designation process defines a consolidation shipping task, such that the inbound merchandise from a plurality of inbound containers is consolidated into one or more outbound containers having a common destination.

A distribution designation process defines a distribution shipping task, such that portions of the inbound merchandise from one or more inbound containers is distributed amongst a plurality of outbound containers.

A user interface allows a user to manage the warehouse execution planning system.

The above-described processes may also be implemented as a method or a sequence of instructions executed by a processor.

The invention can provide one or more of the following advantages. Merchandise can be more efficiently moved through a processing center (e.g., a warehouse or stock yard). By reducing the amount of time from when merchandise enters the processing center to the time it leaves the processing center, overhead can be reduced and profits increased. Additionally, by limiting the number of times that the merchandise is moved within the processing center, processing cost may be reduced. Accordingly, material and merchandise can be handled more efficiently, thus reducing cycle times, inventory costs, and handling costs.

The details of one or more implementations of the invention are set forth in the accompanying drawings and the description below. Other features and advantages of the invention will become apparent from the description, the drawings, and the claims.

DETAILED DESCRIPTION

Figure 1:
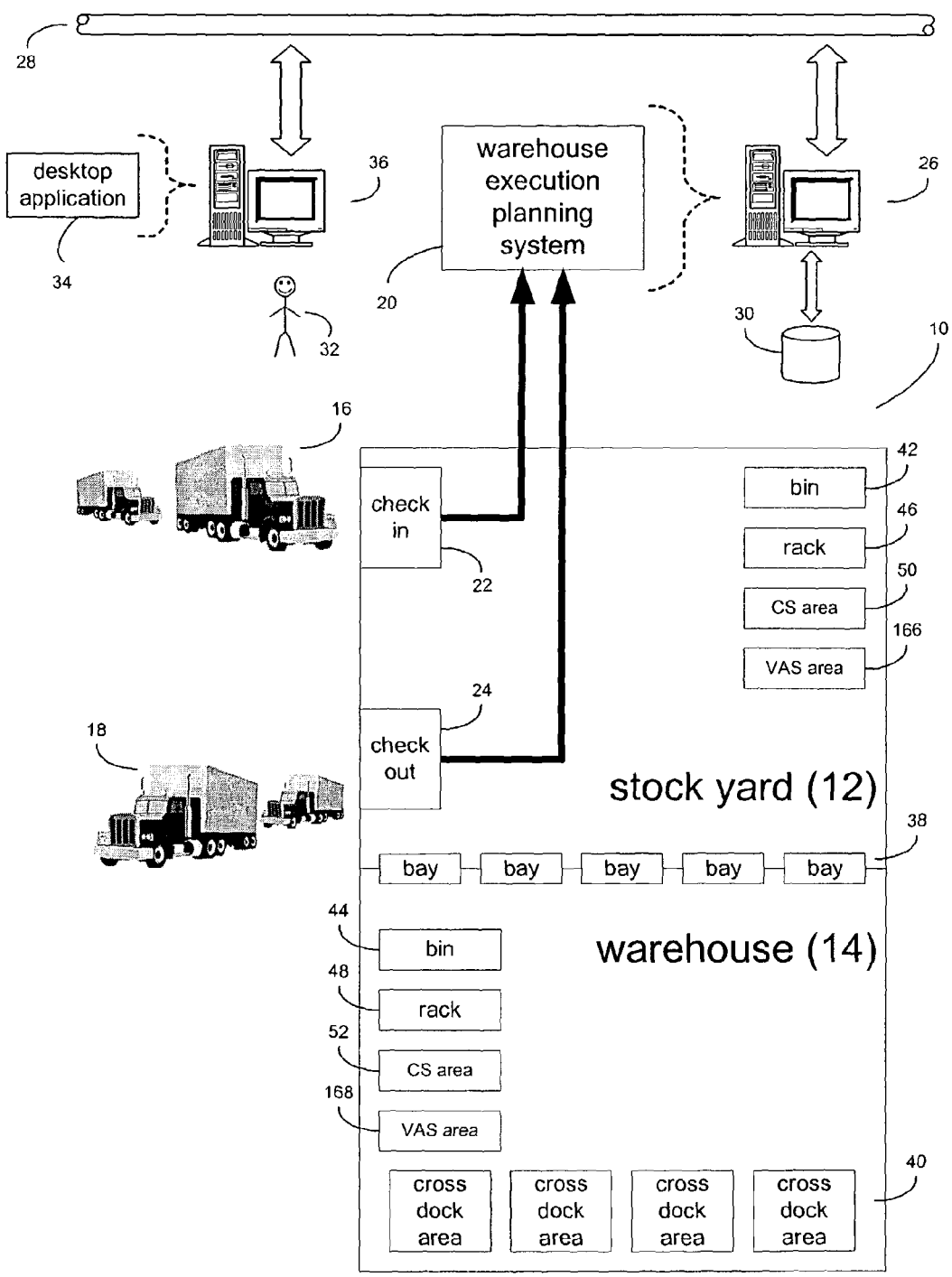
FIG. 1 is a block diagram of a merchandise distribution system including a warehouse execution planning system.

Referring to FIG. 1, a merchandise distribution center 10 includes a stockyard 12 and a processing center 14 (e.g., a warehouse). During the course of business, merchandise is moved into and out of the merchandise distribution center 10, via trailers 16, 18, railcars (not shown), and containers (not shown), collectively referred to as merchandise containers.

A warehouse execution planning system 20 monitors the inbound and outbound documents related to this merchandise and the processes related to distribution center 10. The inbound merchandise (and document(s) related thereto) might be in one of the following locations: within the yard, within the distribution center, within the warehouse, or in transit to the warehouse, for example. Additionally, the outbound merchandise (and document(s) related thereto) might be at any stage of the execution process, even if only in the execution planning stage.

Whenever a trailer, railcar, or container enters or leaves stockyard 12, the trailer, railcar, or container are either checked in at check in point 22 or checked out at check out point 24.

Warehouse execution planning system 20 controls the movement of merchandise within warehouse 14, and resides on and is executed by a computer 26 that may be connected to a network 28 (e.g., the Internet, an intranet, a local area network, or some other form of network). The instruction sets and subroutines of warehouse execution planning system 20 are typically stored on a storage device 30 connected to computer 26.

Storage device 30 may be, for example, a hard disk drive, a tape drive, an optical drive, a RAID array, a random access memory (RAM), or a read-only memory (ROM). A warehouse supervisor/user 32 typically accesses, administers, and uses warehouse execution planning system 20 through a desktop application 34 (e.g., Microsoft Internet Explorer™, Netscape Navigator™, or a specialized user interface) running on a computer 36 that is also connected to the network 28.

Distribution center 10 includes a number of areas for example, bays 38, cross-docking areas 40, and so forth. Warehouse execution planning system 20 monitors these areas and the inbound merchandise received on inbound trailers, railcars, and containers, so that the merchandise can be quickly and efficiently shipped out on outbound trailers, railcars, and containers.

Stockyard 12 and warehouse 14 include temporary storage areas, such as bins 42, 44 racks 46, 48 and cold storage areas 50, 52. In order to increase efficiency, warehouse execution planning system 20 tries to minimize the use of storage areas 42, 44, 46, 48, 50, 52 and, ideally, tries to minimize the number of intermediate steps between the unloading of the merchandise off of an inbound trailer, railcar, or container, and the reloading of that merchandise onto an outbound trailer, railcar or container.

Figure 2:
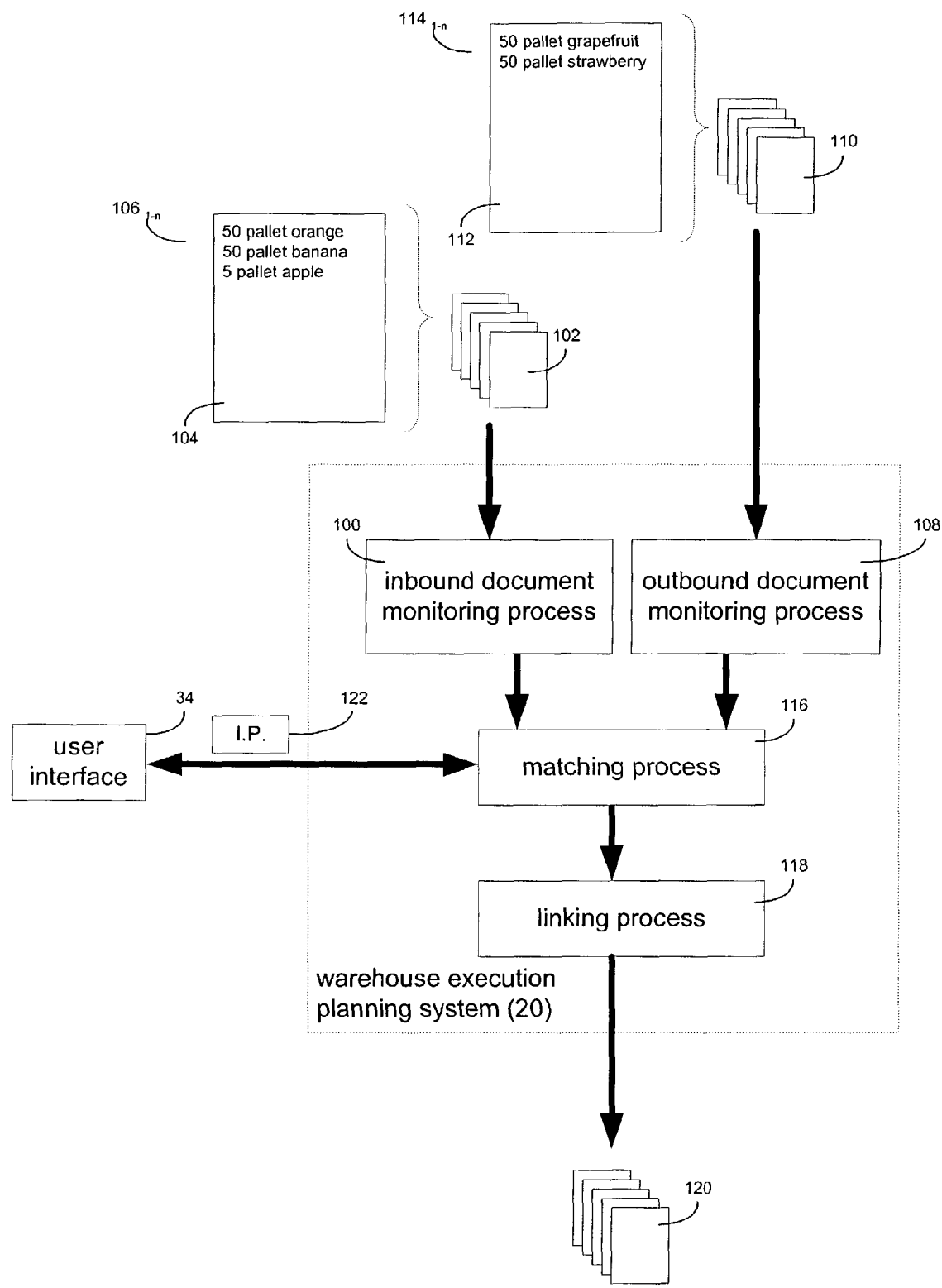
FIG. 2 is a block diagram of the warehouse execution planning system of FIG. 1.

Referring to FIG. 2, warehouse execution planning system 20 includes an inbound document monitoring process 100, which monitors inbound documents 102 (e.g., a document related to an inbound delivery). One or more inbound documents 102 are generated for each trailer, railcar, or container scheduled to arrive at merchandise distribution center 10. Inbound documents 102 are similar to electronic shipping manifests for scheduled inbound deliveries. Each inbound document (e.g., document 104) itemizes the available products $106_{1-n}$ included in the merchandise shipment.

An outbound document monitoring process 108 monitors outbound documents 110 (e.g., a document related to an outbound delivery). Similar to inbound documents 102, one or more outbound documents 110 are generated for each shipment (e.g., trailer, railcar, or container) scheduled to leave merchandise distribution center 10. Outbound document are similar to shipping manifests for scheduled outbound deliveries. Each outbound document (e.g., document 112) itemizes the needed products $114_{1-n}$ to be included in the specific outbound merchandise shipment.

As stated above, any shipments that enter or leave stockyard 12 are checked in at check in point 22 and checked out at check out point 24. As these check in and check out points 22, 24 are interfaced with warehouse execution planning system 20, warehouse execution planning system 20 knows the status of each inbound or outbound delivery, as system 20 knows whether the shipment has arrived to or departed from the stockyard 12.

Warehouse execution planning system 20 includes a matching process 116 that compares the available products $106_{1-n}$ included in one or more of the inbound documents 102 with the needed products $114_{1-n}$ included in one or more of the outbound documents 110. In the event that an available product $106_{1-n}$ is matched to a needed product $114_{1-n}$, a linking process 118 links the matched available and needed products.

This comparison and matching of available products $106_{1-n}$ with needed products $114_{1-n}$ may occur at the time the products arrive, a procedure commonly referred to as opportunistic cross-docking. Alternatively, the comparison and matching of available products $106_{1-n}$ with needed products $114_{1-n}$ may occur prior to the arrival of the products, a procedure commonly referred to as planned cross-docking.

The available products $106_{1-n}$ for opportunistic cross-docking include merchandise that has already arrived. For planned cross-docking, the available products $106_{1-n}$ include merchandise that is scheduled to arrive.

The following opportunistic cross-docking scenarios are applicable: (1) Incoming stock based, i.e., the incoming stock is designated for opportunistic cross-docking, without a specific linkage to outgoing demand; (2) Outgoing demand based, i.e., the outgoing demand is to be fulfilled by cross-docking due to stock shortage in the delivery release time or an existing opportunity of arrived incoming stock; (3) Arrival of incoming stock, which can fulfill outgoing demand that was released for execution but not yet executed with an existing unexecuted transfer order; or (4) Outgoing demand that is released for execution and can be fulfilled with existing unexecuted transfer orders from an inbound delivery, which has existing unexecuted transfer orders. Scenarios (3) and (4) require cancellation of the existing transfer orders and generation of new transfer orders for cross-docking operation.

Once linking (i.e., cross-docking decision making) occurs, an outstanding order for a needed product is fulfilled. Whenever merchandise is designated for cross-docking, the worker receives packing instructions which are based on product quantities. This is aimed at minimizing unnecessary material-handling. Transfer orders 120, which are also known as packing instructions, concern the execution of cross-docking operations and are typically provided to the people who are actually unloading and loading the trailer, container, or railcar containing the products.

A cross-docking decision involves several steps, in which the opportunities are analyzed based on predetermined rules. In most cases, the rule definition is not mandatory for utilizing the cross-docking functionality. The objective is to enable the functionality with minimal mandatory customization/rule settings.

The rules (commonly referred to as influencing parameters 122) are categorized into seven types based on the functionality they are supporting in decision-making. The rule-types are as follows: (a) Planning event rules; (b) Cross-Dock Planning Object Scope; (c) Cross-Dock Matching Strategy; (d) Rules for cross-dock without matching; (e) Group Definition; (f) Group rules (Execution plan general guidelines); and (g) Destination Determination Rules.

(a) Planning Event Rules: Planning event rules determine the triggering events for cross-dock planning (i.e. decision-making). Possible events include: Document introduction (TR/Delivery creation); TO (i.e., Transfer Order) creation (for inbound/outbound/internal delivery); Truck "Check-in"; Manual; and Time, for example.

(b) Cross-Dock Planning Objects Scope: The documents for which execution planning must be conducted have to be specified selection criteria, which are based on the documents' attributes to enable focused planning on specified candidate orders. The documents can be selected from various perspectives, such as: Document attributes, Shipment attributes, Business Partner attributes, Material attributes, and 1 Shipping container attributes, for example. The selection can be done by a specific value, list or range. The delivery attributes include: Organizational level; Delivery type; Consignment stock; Delivery date; Picking date; Weight; Number of line items; Volume; Price; Priority; Door and staging area; Shipping point; Group; and Delivery, for example. The shipment attributes include: Means of transport; Route schedule; Door at warehouse number; Shipment type; Carrier; Carrier type; Status; and Shipment, for example. The business partner attributes include: Business partner type; and Business partner, for example. The material attributes include: Organizational level; Material type; Material category; Material; Promotion; and Batch number, for example. Shipping container attributes include: Arrival date; The amount of time the container is placed in the yard (This rule is used to utilize FIFO rule aims to avoid aging in yard); and Remaining time at the yard (The remaining time at the yard is significant if containers have different allowed lifetime in the yard), for example.

(c) Cross-Dock Matching Strategy: Orders can be fulfilled from cross docking if they comply with the required cross-docking strategy. Therefore, prior to decision-making, all the required parameters of cross-dock strategy should be specified. The following parameters determine the cross-dock strategy:

Cross-dock time window visibility: The user can set the cross-docking time window to allow limited cross-dock planning, not exceeding a certain time limit (i.e., time parameter). For example, all incoming stock until a certain time is relevant for cross-docking.

Unit load: This parameter determines if only unit load cross docking is allowed, or if partial load cross docking is also allowed.

BBD (i.e., Best Before Date): Materials, which are managed by strict FIFO (i.e., first-in-first-out), must follow this rule whenever a cross-docking opportunity is evaluated. Materials for which BBD is defined could have extended cross-docking rules to achieve two goals: (1) Prevent stock in the warehouse from getting scrapped, because the BBD has passed (e.g., you could allow cross-docking if the expiration date of the material is less than fourteen days younger than the oldest inventory in the warehouse); and (2) Fulfill customer 10 requirement for a specific remaining lifetime of the material (e.g., you could allow cross docking for customer "x" if the material's remaining lifetime is at least six months).

Batch determination: Where the outgoing demand determines the requirement of a specific batch, it must be considered as a strict requirement that must be fulfilled by the cross-docking mechanism.

Stock ownership: Stock ownership determines the availability of stock for a specific outbound delivery. The outbound delivery demand is either for consignment stock or for own stock. Similarly, the incoming stock is either for consignment stock or for own stock. The cross-docking algorithm should look for a match accordingly. Therefore, consignment stock and own stock cannot be mixed (i.e. it is possible to cross-dock either one but not together).

Note that strict FIFO, batch determination and stock ownership are mandatory rules for all possible strategies. These rules are defined externally and must always be checked to ensure that the cross-docking operation will not result in any external rule contradiction.

(d) Rules for cross-dock without matching: This type of rule is used in cases where incoming stock is designated for cross-docking, without a specific linkage to outgoing demand (scenario 1 of opportunistic cross-docking). This scenario is usually utilized based on known/estimated demand requirements. Relevant parameters to determine when this scenario should be applied include: Material; Material type; Material category; Promotion; Quantity; From date; To date; and Time Range, for example.

(e) Group definition: The group definition assists in managing a large order pool by handling the execution plan by the group's general guidelines. Grouping criteria, by which the system should assign documents to groups, should be defined. The selected planning objects will be divided into execution groups based on the grouping criteria, consisting of a set of parameters that have an impact on time targets and geographical aspects. Another option to determine groups is based on pre-defined variants. The variants are usually generated in cases of consistent/known execution management (e.g. grouping of orders by pre-defined group of destinations: Group 1—Rome and Venice, Group 2—Munich and Frankfurt). The variants can be generated from a template, which consists of parameters similar to the planning scope parameters. Options for grouping criteria include: number of shipments; number of customers; number of doors (in resolution of inbound/outbound/both); WM group; number of promotions; number of allocations; and Variants generated based on planning scope parameters, for example.

(6) Group rules (Execution plan general guidelines): The execution plan consists of general guidelines for cross-dock execution: Last picking date and time from cross-dock (LPX); Last picking date and time from storage (LPS); and Release date and time (RLS). The three picking dates can be determined in various manners: Manual determination (i.e., the times explicitly determined by the user, who has a comprehensive view over execution parameters, which have an impact on those dates, such as number of resources, resource capacity, number of pallets to be moved, partial load and unit load movement); Customization (i.e., rough time estimation can be done based on customization of influencing parameters); BAdI (i.e., Business Add-Ins should enable customer-based time estimation. The general guidelines, which are derived from the above-mentioned definitions, are: LPX (which determines the maximum time in which cross-dock can take place); Minimum (LPX, LPS) (which determines the time by which the cross-docking plan can be overruled in order to minimize the risk of missing the due date. The plan should be the means and not the target); LPX—Minimum (LPX, LPS) (which determines the time in which opportunistic cross-dock, which involves TO cancellation can take place); and RLS (which determines the time by which all items, which are not planned for cross-dock, should be released (WM group, if exists, overrules this time).

Note that this type of rule is mostly recommended for generating boundaries for cross docking execution; however, it is not mandatory (the user can disable it).

(7) Destination Determination Rules: Once a cross-docking requirement is identified and the execution is triggered, the destination has to be determined based on the following parameters:

Number of stages: The cross-docking movement flow has to be configured to indicate the desired number of stages (0-m) and to enable explicit destination determination. The destination can be defined globally or by shipment/delivery attributes and/or by material attributes (e.g. size, weight, volume, conditions) that have implications on destination determination. For example, stock that should be maintained in cool storage should be directed to a stage with appropriate conditions.

Operation method of partial load: Where a partial quantity is required to fulfill outgoing demand, two operation methods are applicable: Cross-docking via an intermediate location to perform repacking based on the requirements; and Replenishment cross docking to fix picking location. The user has to specify which operation method is preferable at warehouse and business scenario levels.

VAS (i.e., value-added service): Following the determination of the cross-docking requirement, VAS requirements must also be evaluated. Where VAS requirements exist, the VAS destination will be the first intermediate point.

While the match between available and needed products must be identical concerning the specific product, it need not be identical concerning quantity. For example, a pallet containing fifty cases of oranges (i.e., the available product) can fulfill two outstanding orders for twenty-five cases of oranges (i.e., the needed products), the only caveat being that some time between the unloading of the fifty case order and the loading of the two twenty-five case orders, the fifty case order (i.e., the pallet) will have to be broken down in a cross-docking area (e.g., cross-docking area 40). This will be discussed below in greater detail. Further, the inbound order need not be larger than the outbound order. For example, two twenty-five case inbound orders may be used to fulfill one fifty case outbound order of oranges. Alternatively, the inbound order quantity may exactly match the outbound order quantity.

Figure 3:
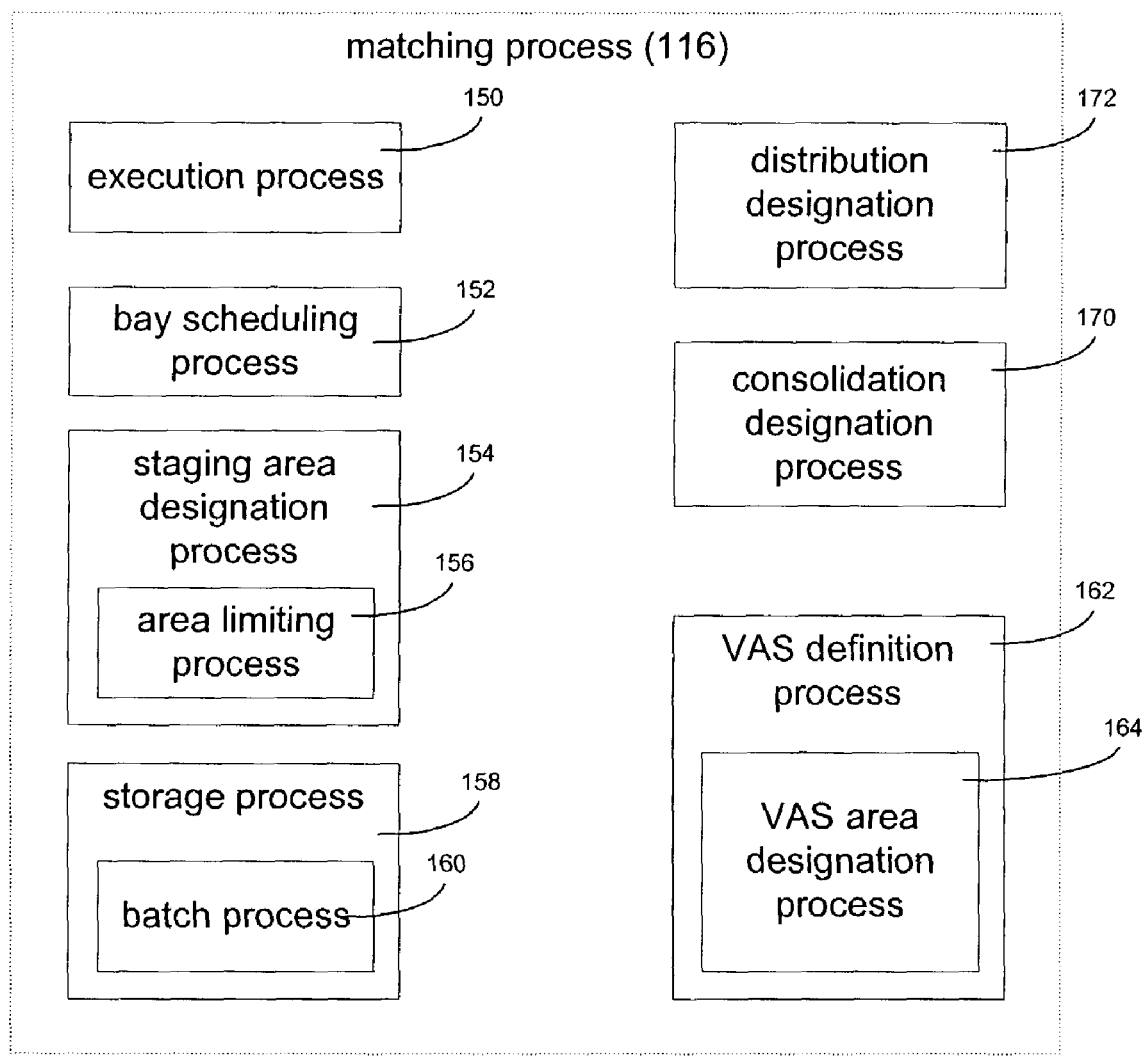
FIG. 3 is a block diagram of the matching process of FIG. 2.

Referring also to FIG. 3, the merchandise processing center 10 functions most efficiently when the quantity of the available product is equal to the quantity of the needed product, as it is easier to simply transfer a full pallet from, for example, an inbound trailer and move it to, for example, an outbound trailer. In the event that the trailer needs to be broken down into two or more smaller loads, efficiency is reduced. Therefore, warehouse execution planning system includes an execution process 150 that allows the supervisor 32 of the system 20 to define a minimum pick quantity. This minimum pick quantity specifies the minimum portion of an order that can be picked for placement on an outbound trailer. For example, if an entire small trailer of oranges is scheduled to arrive in merchandise distribution center 10 and this entire small trailer is to be transferred into one larger trailer for shipping to an factory that makes orange juice, the minimum pick quantity for this inbound order would be the load itself (e.g., 30 pallets). This minimum pick quantity could be as large or as small as desired by the supervisor. For example, the minimum pick quantity may be defined as a pallet of oranges, a case of oranges from a pallet of oranges, or a single orange from a case of oranges.

Whenever a trailer, container, or railcar of merchandise arrives at merchandise distribution center 10, this trailer, container, or railcar is unloaded before load distribution can occur. As stated above, there are a finite number of bays 38 available within merchandise distribution center 10. A bay 38 can be a loading/unloading platform, a garage door, or simply a designated area within yard 12 or warehouse 14.

Warehouse execution planning system 20 includes a bay scheduling system 152 for assigning a bay to inbound and outbound trailers, containers, and railcars. In addition to designating the location of the bay, the time allotted to perform the task (e.g., load the trailer, container, or trailer, unload the trailer, container, or railcar, etc.) is also specified. Further, the location of the bay itself within the merchandise distribution center 10 may also be taken into consideration so that the distance that product needs to travel within the center is reduced. For example, assume that an outbound trailer is being loaded with twenty pallets of oranges and twenty pallets of grapefruit before shipment. If this trailer is assigned to bay two and the inbound trailer from our above-stated example (which contains fifty pallets of oranges) arrives at the distribution center 10, this inbound trailer with the pallets of oranges may be assigned to bay one (which is next to bay two), thus speeding the transfer of the twenty pallets of oranges from the inbound to the outbound trailer. Further, if an inbound shipment of fifty pallets of grapefruit is scheduled to arrive at distribution center 10 at 9:00 a.m., bay three may be assigned to this inbound trailer containing the grapefruit, again facilitating the speedy transfer of the twenty pallets of grapefruit from the inbound trailer to the outbound trailer. Additionally, as the inbound grapefruit trailer is scheduled to arrive at 9:00 a.m., the outbound trailer (i.e., the trailer being loaded with the twenty pallets of oranges and the twenty pallets of grapefruit) may only be assigned to bay two until 9:30 a.m., thus allowing thirty minutes to transfer the pallets of grapefruit from the inbound grapefruit trailer to the outbound trailer.

As stated above, in the event that the product is transferred in less than a unit quantity (e.g., a pallet), the product must be processed in a cross-docking area 40 prior to being loaded onto the outbound trailer. Accordingly, warehouse execution planning system 20 includes a cross-docking area designation process 154 for assigning these cross-docking areas to the individual inbound or outbound shipments of merchandise. For example, if an outbound shipment needed one case of oranges, a pallet of oranges would have to be taken to an assigned cross-docking area so that the pallet can be broken down and the single case removed. Accordingly, whenever additional outbound shipments need one or more cases of oranges, these cases of oranges may be pulled directly from the cross-docking area in which the pallet of oranges is being temporarily stored. This is typically referred to as cross-docking without link establishment.

As with the bay assignments, the cross-docking areas are assigned in accordance with a time slot. Therefore, if the truck containing the pallet of oranges is due to arrive at 9:00 a.m. and the pallet is expected to be unloaded by 9:15 a.m., a cross-docking area may be assigned from 9:15 a.m. until 9:30 a.m., thus allowing time for the workers to break down this pallet and any others on the inbound shipment that need to be broken down.

Typically, as discussed above, the efficiency of the product distribution is reduced as the use of cross-docking areas increases. Therefore, it is desirable to limit the use of cross-docking areas as much as possible. Typically, the nomenclature of loading and unloading trailers is based on the use of cross-docking areas. For example, there are:

zero-stage distributions (i.e., directly from inbound to outbound trailer);

one-stage distributions (inbound trailer→cross-docking area→outbound trailer); and multi-stage distributions (inbound trailer→first cross-docking area→VAS area→outbound trailer).

The number of cross-docking areas and VAS areas may be increased or decreased based on the specific cross-docking requirements of the merchandise being processed. By minimizing the use of cross-docking areas, the efficiency of the merchandise distribution is increased.

Staging area designation process 154 includes an area limiting process 156 that allows the supervisor to assign a maximum cross-dock number that limits the use of cross-docking areas. For example, if the maximum cross-dock number is set to two, the distribution of a load of merchandise will never require the use of more than two consecutive cross-docking areas. These maximum cross-dock numbers may be assigned to individual inbound shipments or assigned as defaults for the entire warehouse execution planning system 20.

As stated above, whenever a unit shipment (e.g., a pallet) of a product is broken down is a cross-docking area, there are typically residual pieces of product that need to be stored. Accordingly, warehouse execution planning system 20 includes a storage process 158 that designates a storage area (such as bins 42, 44, racks 46, 48, and cold storage areas 50, 52) for storing this residual available product. Continuing with the above-stated example, if a pallet of oranges that contains fifty cases of oranges is broken down so that one case of oranges can be placed onto an outbound trailer, there are forty-nine cases of residual available product that need to be stored. In the event that no other outbound trailers need any additional oranges, these forty-nine cases of oranges will be stored to free up the cross-docking area that the pallet was broken down in. Again, these storage areas are typically assigned in time slots. Therefore, if it is expected that the remaining forty-nine cases of oranges will be assigned to and loaded on outbound trailers in the next twelve hours, the storage area will be assigned for that length of time. As oranges are a perishable product, this type of product would typically be assigned to a cold storage area (such as cold storage areas 50, 52).

Storage process 158 may include a batch process 160 that defines the maximum time that the residual product may stay in the cross-docking area or storage area before it is placed onto an outbound shipment. This process 160, which is typically used for perishable products (e.g., milk, eggs, produce, meat, etc.), minimizes the spoilage of product and helps ensure that a fresh product arrives at its final destination.

For example, as oranges are a perishable product, the amount of time that a pallet of oranges waits to be matched in a cross-docking area should be controlled. Accordingly, batch process 160 may be used to define a time limit after which the residual oranges on the pallet are moved into a cold storage area. This time limit may be, for example, six hours. Further, once the residual oranges are moved into the cold storage area, they cannot stay in there indefinitely, as they will spoil. Therefore, batch process 160 may further be used to define a time limit before which the residual oranges in the cold storage area must be matched and added to an outbound merchandise shipment. This time limit may be, for example, three days.

Often, value added services (VAS) are added to available products to increase their value. For example, clothing that arrives in boxes may be placed onto hangers, components that arrive unassembled from multiple manufactures may be assembled, etc. Accordingly, a VAS definition process 162 allows the supervisor to define the value added services to be applied to the inbound products. Additionally, VAS definition process 162 may include a VAS designation area 164 for defining a VAS area 166, 168 for the products to which value added services are to be added. Typically, the act of adding a value added service is considered a stage. Therefore, continuing with the above-stated example, if the single case of oranges is to be arranged into a fruit basket (i.e., the value added service), that would become a two-stage distribution, i.e., inbound trailer→stage one (break down pallet to remove single case of oranges)→stage two (arrange single case of oranges into a fruit basket)→outbound trailer.

As stated above, inbound shipments are typically processed in one of two ways, i.e., multiple inbound shipments or merchandise stored in a storage area are combined to provide one outbound shipment (a consolidation shipping task); or a single inbound shipment is broken down to provide multiple outbound shipments (a distribution shipping task).

Accordingly, warehouse execution planning system 20 includes a consolidation designation process 170 for facilitating such consolidation shipping tasks, in that it allows the supervisor to easily combine multiple inbound product shipments and/or merchandise stored in a storage area to provide a single larger outbound product shipment.

Further, a distribution designation process 172 facilitates such distribution shipping tasks, in that it allows the supervisor to easily break down a single inbound product shipment into multiple outbound product shipments.

Figure 4:
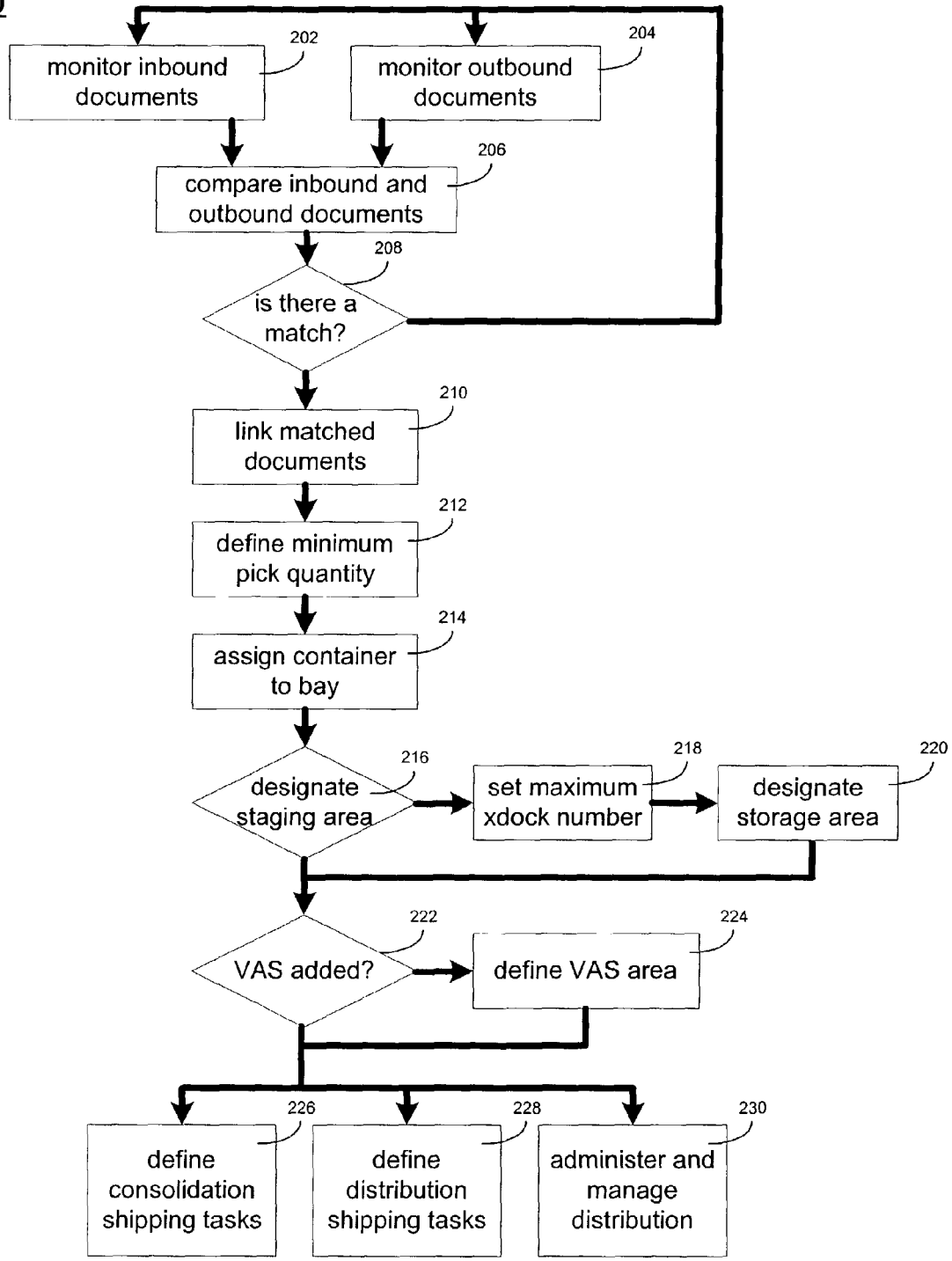
FIG. 4 is a flowchart of a warehouse execution planning method.

Referring to FIG. 4, warehouse execution planning method monitors inbound documents (202) and outbound documents (204). Available products specified in the inbound documents are compared to needed products itemized in the outbound documents to determine if a match occurs (206, 208). If an available product matches a needed product, these matched available and needed products are linked (210), thus fulfilling an outstanding order for a needed product with an available product.

A minimum pick quantity is defined for a particular inbound available product (212). Each inbound or outbound container (e.g. a trailer, a container, or a railcar) is assigned to a bay (214). One or more cross-docking areas may be assigned to the available products included in the inbound merchandise (216), and a maximum cross-dock number may be set (218).

If the product is going to need to be temporarily stored, a storage area is designated (220). Any value added services (VAS) being added to the product are defined (222) and a VAS area is assigned to the product to which the services are added (224).

Additionally, consolidation shipping tasks are defined (226) and distribution shipping tasks may also be defined (228). A warehouse supervisor configures and administers the method by which the merchandise is distributed and managed (230).

The system described herein is not limited to the implementation described above; it may find applicability in any computing or processing environment. The system may be implemented in hardware, software, or a combination of the two. For example, the system may be implemented using circuitry, such as one or more of programmable logic (e.g., an ASIC), logic gates, a processor, and a memory.

The system may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language. Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system may also be implemented as a machine-readable storage medium, configured with a computer program, where, upon execution, instructions in the computer program cause a machine to operate to perform the functions of the system described above.

Implementations of the system may be used in a variety of applications. Although the system is not limited in this respect, the system may be implemented with memory devices in microcontrollers, general-purpose microprocessors, digital signal processors (DSPs), reduced instruction-set computing (RISC), and complex instruction-set computing (CISC), among other electronic components.

Implementations of the system may also use integrated circuit blocks referred to as main memory, cache memory, or other types of memory that store electronic instructions to be executed by a microprocessor or store data that may be used in arithmetic operations.

A number of implementations have been described. Nevertheless, it will be understood that various modifications may be made. Accordingly, other implementations are within the scope of the following claims.

What is claimed is:

1. A computer program, tangibly stored on a computer-readable medium, comprising instructions operable to cause a computer having a display and a pointing device operatively coupled to a cursor displayed on the display to:
   monitor inbound documents that itemizes one or more available products included in inbound merchandise;
   monitor outbound documents that itemizes one or more needed products to be included in outbound merchandise;
   compare the one or more available products itemized in the inbound documents to the one or more needed products itemized in the outbound documents to determine if a match occurs, wherein the match is determined prior to arrival of the inbound merchandise at a processing center;
   link the match of the one or more available products and the one or more needed products to fulfill an outstanding order for the one or more needed products with the one or more available products; and
   transfer the one or more available products to fulfill the outstanding order directly upon receipt of the one or more available products.

2. The computer program of claim 1 wherein the instructions to compare the one or more available products include instructions to define a minimum pick quantity, wherein the minimum pick quantity specifies a minimum quantity of an available product that may be used to fulfill an outstanding order for a needed product.

3. The computer program of claim 2 wherein the minimum quantity is a case of available product.

4. The computer program of claim 2 wherein the minimum quantity is a pallet of available product.

5. The computer program of claim 1 wherein the inbound merchandise is delivered to the processing center in one or more inbound containers, the outbound merchandise is delivered from the processing center in one or more outbound containers, and the instructions to compare the one or more available products include instructions to assign each of the inbound and outbound containers to a bay, wherein the inbound merchandise is unloaded from the inbound container in the bay to which the inbound container is assigned, and the outbound merchandise is loaded into the outbound container in the bay to which the outbound container is assigned.

6. The computer program of claim 5 wherein the container is a trailer.

7. The computer program of claim 5 wherein the container is a railroad car.

8. The computer program of claim 5 wherein the bay comprises a garage door.

9. The computer program of claim 5 wherein the instructions to compare the one or more available products include instructions to assign one or more cross-docking areas to at least one of the one or more available products included in the inbound merchandise, wherein the one or more available products, which are unloaded from an inbound container, are placed in the cross-docking area and divvied up to fulfill multiple outstanding orders for the one or more needed products.

10. The computer program of claim 9 wherein the instructions to assign one or more cross-docking areas include instructions to define a maximum cross-dock number, wherein the maximum cross-dock number specifies the maximum number of cross-docking areas available to at least one of the one or more available products included in the inbound merchandise.

11. The computer program of claim 9 wherein the instructions to compare the one or more available products include instructions to designate a storage area for any residual available products that are unmatched after all outstanding orders have been fulfilled.

12. The computer program of claim 11 wherein the storage area is a storage bin.

13. The computer program of claim 11 wherein the storage area is a cold storage area.

14. The computer program of claim 11 wherein the instructions to designate a storage area include instructions to define a time limit before which any matching of residual available products must occur.

15. The computer program of claim 1 wherein the instructions to compare the one or more available products include instructions to define value added services (VAS) to be applied to at least one of the one or more available products.

16. The computer program of claim 15 wherein the instructions to define the value added services include instructions to assign one or more VAS areas to the at least one of the one or more available products to which the value added services are applied.

17. The computer program of claim 1 wherein the inbound merchandise is delivered to the processing center in one or more inbound containers, the outbound merchandise is delivered from the processing center in one or more outbound containers, and the instructions to compare the one or more available products include instructions to define a consolidation shipping task, wherein the inbound merchandise from the one or more inbound containers is consolidated into the one or more outbound containers having a common destination.

18. The computer program of claim 1 wherein the inbound merchandise is delivered to the processing center in one or more inbound containers, the outbound merchandise is delivered from the processing center in one or more outbound containers, and the instructions to compare the one or more available products include instructions to define a distribution shipping task, wherein portions of the inbound merchandise from the one or more inbound containers is distributed amongst the one or more outbound containers.

19. The computer program of claim 1 further comprising instructions to allow a user to administer the warehouse execution planning system.

20. A warehouse execution planning method comprising:
monitoring inbound documents, each of which concerns a delivery of inbound merchandise to a processing center, wherein each inbound document itemizes one or more available products included in the inbound merchandise;
monitoring outbound documents, each of which concerns the shipping of outbound merchandise from the processing center, wherein each outbound document itemizes one or more needed products to be included in the outbound merchandise;
comparing, by a computer, the one or more available products itemized in the inbound documents to the one or more needed products itemized in the outbound documents to determine if a match occurs, wherein the match is determined prior to arrival of the inbound merchandise at the processing center;
linking the match of the one or more available products and the one or more needed products to fulfill an outstanding order for the one or more needed products with the one or more available products; and
transferring the one or more available products to fulfill the outstanding order directly upon receipt of the one or more available products.

21. The method of claim 20 wherein comparing the one or more available products includes defining a minimum pick quantity, wherein the minimum pick quantity specifies a minimum quantity of an available product that may be used to fulfill an outstanding order for a needed product.

22. The method of claim 21 wherein the minimum quantity is a case of available product.

23. The method of claim 21 wherein the minimum quantity is a pallet of available product.

24. The method of claim 20 wherein the inbound merchandise is delivered to the processing center in one or more inbound containers, the outbound merchandise is delivered from the processing center in one or more outbound containers, and comparing the one or more available products includes assigning each of the inbound and outbound containers to a bay, wherein the inbound merchandise is unloaded from the inbound container in the bay to which the inbound container is assigned, and the outbound merchandise is loaded into the outbound container in the bay to which the outbound container is assigned.

25. The method of claim 24 wherein the container is a trailer.

26. The method of claim 24 wherein the container is a railroad car.

27. The method of claim 24 wherein the bay comprises a garage door.

28. The method of claim 24 wherein comparing the one or more available products includes assigning one or more cross-docking areas to at least one of the one or more available products included in the inbound merchandise, wherein the one or more available products, which are unloaded from an inbound container, are placed in the cross-docking area and divvied up to fulfill multiple outstanding orders for needed products.

29. The method of claim 28 wherein assigning one or more cross-docking areas includes defining a maximum cross-dock number, wherein the maximum cross-dock number specifies the maximum number of cross-docking areas available to at least one of the one or more available products included in the inbound merchandise.

30. The method of claim 28 wherein comparing the one or more available products includes designating a storage area for any residual available products that are unmatched after all outstanding orders have been fulfilled.

31. The method of claim 30 wherein the storage area is a storage bin.

32. The method of claim 30 wherein the storage area is a cold storage area.

33. The method of claim 30 wherein designating a storage area includes defining a time limit before which any matching of residual available products must occur.

34. The method of claim 20 wherein comparing the one or more available products includes defining value added services (VAS) to be applied to at least one of the one or more available products.

35. The method of claim 34 wherein defining the value added services includes assigning one or more VAS areas to the at least one of the one or more available products to which the value added services are applied.

36. The method of claim 20 wherein the inbound merchandise is delivered to the processing center in one or more inbound containers, the outbound merchandise is delivered from the processing center in one or more outbound containers, and comparing the one or more available products includes defining a consolidation shipping task, wherein the inbound merchandise from a plurality of inbound containers is consolidated into one or more outbound containers having a common destination.

37. The method of claim 20 wherein the inbound merchandise is delivered to the processing center in one or more inbound containers, the outbound merchandise is delivered from the processing center in one or more outbound containers, and comparing the one or more available products includes defining a distribution shipping task, wherein portions of the inbound merchandise from the one or more inbound containers is distributed amongst the one or more outbound containers.

38. The method of claim 20 further comprising allowing a user to administer the warehouse execution planning method.

39. A warehouse execution planning system comprising:
an inbound document monitoring component that monitors inbound documents, each of which concerns the delivery of inbound merchandise to a processing center, wherein each inbound document itemizes one or more available products included in the inbound merchandise;
an outbound document monitoring component that monitors outbound documents, each of which concerns the shipping of outbound merchandise from the processing center, wherein each outbound document itemizes one or more needed products to be included in the outbound merchandise;
a matching component that compares the one or more available products itemized in the inbound documents to the one or more needed products itemized in the outbound documents to determine if a match occurs, wherein the match is determined prior to arrival of the inbound merchandise at the processing center; and
a linking component, responsive to the match occurring between an available product and a needed product, that links the match of the one or more available products and the one or more needed products, so that an outstanding order for the needed product is fulfilled with the available product, the available product is transferred to fulfill the outstanding order directly upon receipt of the available product.

40. The system of claim 39 wherein the matching component includes an execution component that defines a minimum pick quantity, wherein the minimum pick quantity specifies a minimum quantity of the available product that may be used to fulfill the outstanding order for the needed product.

41. The system of claim 40 wherein the minimum quantity is a case of available product.

42. The system of claim 40 wherein the minimum quantity is a pallet of available product.

43. The system of claim 39 wherein the inbound merchandise is delivered to the processing center in one or more inbound containers, the outbound merchandise is delivered from the processing center in one or more outbound containers, and the matching component includes a bay scheduling component that assigns each of the inbound and outbound containers to a bay, wherein the inbound merchandise is unloaded from the inbound container in the bay to which the inbound container is assigned, and the outbound merchandise is loaded into the outbound container in the bay to which the outbound container is assigned.

44. The system of claim 43 wherein the container is a trailer.

45. The system of claim 43 wherein the container is a railroad car.

46. The system of claim 43 wherein the bay comprises a garage door.

47. The system of claim 43 wherein the matching component includes a cross-docking area designation component that assigns one or more cross-docking areas to the one or more of the available products included in the inbound merchandise, wherein the one or more available products, which are unloaded from an inbound container, are placed in the cross-docking area and divvied up to fulfill multiple outstanding orders for the one or more needed products.

48. The system of claim 47 wherein the cross-docking area designation component includes an area limiting component that defines a maximum cross-dock number, wherein the maximum cross-dock number specifies the maximum number of cross-docking areas available to at least one of the one or more available products included in the inbound merchandise.

49. The system of claim 47 wherein the matching process includes a storage component that designates a storage area for any residual available products that are unmatched after all outstanding orders have been fulfilled.

50. The system of claim 49 wherein the storage area is a storage bin.

51. The system of claim 49 wherein the storage area is a cold storage area.

52. The system of claim 49 wherein the storage component includes a batch component that defines a time limit before which any matching of residual available products must occur.

53. The system of claim 39 wherein the matching component includes a VAS definition component that defines the value added services to be applied to at least one of the one or more available products.

54. The system of claim 53 wherein the VAS definition component includes a VAS area designation component that assigns one or more VAS areas to the at least one of the one or more available products to which the value added services are applied.

55. The system of claim 39 wherein the inbound merchandise is delivered to the processing center in one or more inbound containers, the outbound merchandise is delivered from the processing center in one or more outbound containers, and the matching component includes a consolidation designation component that defines a consolidation shipping task, wherein the inbound merchandise from the one or more inbound containers is consolidated into the one or more outbound containers having a common destination.

56. The system of claim 39 wherein the inbound merchandise is delivered to the processing center in one or more inbound containers, the outbound merchandise is delivered from the processing center in one or more outbound containers, and the matching component includes a distribution designation component that defines a distribution shipping task, wherein portions of the inbound merchandise from the one or more inbound containers is distributed amongst the one or more outbound containers.

57. The system of claim 39 further comprising a user interface for allowing a user to administer the warehouse execution planning system.

58. A computer readable medium for managing merchandise, the computer readable medium encoded with a computer program having instructions configured to cause a computer to perform the following actions:
monitor inbound documents, each of which concerns the delivery of inbound merchandise to a processing center, wherein each inbound document itemizes one or more available products included in the inbound merchandise;
monitor outbound documents, each of which concerns the shipping of outbound merchandise from the processing center, wherein each outbound document itemizes one or more needed products to be included in the outbound merchandise;
compare the one or more available products itemized in the inbound documents to the one or more needed products itemized in the outbound documents to determine if a match occurs, wherein the match is determined prior to arrival of the inbound merchandise at the processing center; and
link the match of the one or more available products and the one or more needed products, so that an outstanding order for a needed product is fulfilled with an available product, the available product is transferred to fulfill the outstanding order directly upon receipt of the available product.

59. The computer readable medium of claim 58, wherein the computer readable medium comprises a programmable processor and the computer readable medium is configured by instructions stored in a memory for execution by the processor.

60. A method for providing on a computer display device a display of a warehouse execution planning system, the method comprising:
monitoring inbound documents, each of which concerns the delivery of inbound merchandise to a processing center, wherein each inbound document itemizes one or more available products included in the inbound merchandise;
monitoring outbound documents, each of which concerns the shipping of outbound merchandise from the processing center, wherein each outbound document itemizes one or more needed products to be included in the outbound merchandise;
comparing, by a computer, the one or more available products itemized in the inbound documents to the one or more needed products itemized in the outbound documents to determine if a match occurs, wherein the match is determined prior to arrival of the inbound merchandise at the processing center; and
linking the match of the one or more available products and the one or more needed products, wherein an outstanding order for a needed product is fulfilled with an available product, the available product is transferred to fulfill the outstanding order directly upon receipt of the available product.

* * * * *